United States Patent [19]
Zebian

[11] Patent Number: 5,372,718
[45] Date of Patent: Dec. 13, 1994

[54] FILTERING DEVICE

[76] Inventor: Ghassan W. Zebian, 6726 N. 34th Ave., Phoenix, Ariz. 85017

[21] Appl. No.: 77,747

[22] Filed: Jun. 18, 1993

[51] Int. Cl.⁵ ............................................. B01D 29/58
[52] U.S. Cl. ....................... 210/301; 210/305; 210/315; 210/436; 210/455; 210/458; 210/460; 210/472; 210/499; 4/290; 4/DIG. 14; 4/DIG. 19
[58] Field of Search ................. 4/286, 288, 289, 290, 4/292, 668, 671, 672, 675, 681, 695, DIG. 14, DIG. 19; 210/300, 299, 301, 305, 314, 315, 435, 436, 455, 457, 458, 459, 460, 463, 472, 497.01, 499

[56] References Cited
U.S. PATENT DOCUMENTS

| | | |
|---|---|---|
| 674,294 | 5/1901 | Cox . |
| 814,481 | 3/1906 | Sovard . |
| 1,589,544 | 6/1926 | Natow et al. . |
| 2,031,589 | 2/1936 | Burckhalter et al. ............... 210/165 |
| 2,042,537 | 6/1936 | Liddell ................. 29/163.5 |
| 2,253,686 | 8/1941 | Burckhalter et al. ............... 210/131 |
| 2,371,895 | 3/1945 | Kingman ................. 210/170 |
| 3,303,933 | 2/1967 | Huff ................. 210/459 |
| 3,388,802 | 6/1968 | Wilkinson ................. 210/458 |
| 3,398,830 | 8/1968 | Harnquist ................. 210/459 |
| 3,680,706 | 8/1972 | Baer et al. ................. 210/238 |
| 3,722,686 | 3/1973 | Arnett et al. ................. 210/170 |
| 3,751,734 | 8/1973 | Lumadue ................. 4/197 |
| 4,045,351 | 8/1977 | Peterson ................. 210/238 |
| 4,051,042 | 9/1977 | Tullier et al. ................. 210/409 |
| 4,082,676 | 4/1978 | Dulger ................. 210/447 |
| 4,111,814 | 9/1978 | Kargge ................. 210/323 |
| 4,207,631 | 6/1980 | Baggey ................. 4/286 |
| 4,297,212 | 10/1981 | Padgett, Sr. ................. 210/168 |
| 4,686,037 | 8/1987 | Lang ................. 210/460 |
| 4,909,937 | 3/1990 | Hoffman et al. ................. 210/458 |
| 4,949,406 | 8/1990 | Canelli ................. 4/288 |
| 5,053,129 | 10/1991 | Kitson ................. 210/232 |

Primary Examiner—Robert A. Dawson
Assistant Examiner—W. L. Walker
Attorney, Agent, or Firm—Don J. Flickinger; Robert A. Parsons; Jordan M. Meschkow

[57] ABSTRACT

A housing including an inlet conduit and an outlet, carrying a reservoir for collecting filtered liquid. The reservoir is secured within the housing by a lid. A separator assembly is carried by the reservoir and includes a strainer assembly for removing materials from a liquid inflowing from the inlet conduit, an inner container and an outer container. The outer container is covered by a lid having an opening for sealably receiving the inlet conduit. The inner and outer container cooperate to hinder the flow of liquid, giving materials more dense than the fluid time to settle, and materials less dense than the liquid time to rise to and be contained by the lid.

19 Claims, 4 Drawing Sheets

FILTERING DEVICE

BACKGROUND OF THE INVENTION

1. Field of the Invention

This invention relates to filtering devices.

More particularly, the present invention relates to devices for filtering materials from a liquid.

In a further and more specific aspect, the present invention concerns a filtering device which uses a density gradient principle to filter materials having greater and lesser density from a liquid.

2. The Prior Art

In many situations, filtering a flowing liquid is desirable. Generally, filtering is desirable when a flowing liquid contains or can collect contaminants and foreign materials which may be liquid or solid. These materials may cause problems in some manner if they are allowed to remain in the liquid. There are many types of liquids which may be filtered, but one of the most common is water. Water is used daily by most people, and in many of its applications picks up foreign materials. These materials may cause problems such as blocking conduits, especially when the water is being drained to a septic or sewer system. The materials picked up by water may be solids or liquids, and have greater or lesser density than water. In drains, such as those extending from a kitchen sink or bathroom sink, a large amount of material can be carried by draining water. The material may include solids, such as food particles and hair or liquids such as oils and grease.

Conventional sinks use a bend or trap in which a fluid seal is formed by water collecting in the lower bend. The collected water prevents sewer gasses from passing out through the drain. The purpose of these traps, however, is not to trap or prevent flow through of materials carried by water, and this is, in fact, the result in most cases. Generally draining water will force solids past the trap, since it is directly under the drain in most cases. Once past the trap, material carried by the water may collect on protuberance or be deposited on the sides of the drain conduit. The collection of solids, or contaminating liquids such as oil or grease in the conduit can prevent the free passage of the draining water. Devices have been developed which attempt to limit material entering the drain to small particles. These include basket and strainer devices which are received in the drain opening of a sink. Large solids are prevented from entering the drain, and the basket or strainer is easily removed for cleaning. While successful in removing large solids from water, smaller particles, grease, an oils are not removed from the draining water. These can collect downstream of the trap in the drain system inhibiting the flow of draining liquid and causing clogging.

When a blockage is formed in the conduit downstream of the trap, it is typically removed by using chemical solvents or mechanical devices such as an auger, commonly referred to as a "snake". Chemicals tend to be expensive, very corrosive and detrimental to the environment, while using a "snake" can be an extensive, time consuming procedure as well as labor intensive. Generally, if a mechanical device such as a "snake" is needed to remove a blockage, the services of a plumber is also required to operate it. If the clog is located in a less assessable area, a plumber may need to be called, causing a great deal of inconvenience and cost.

Filtering devices for removing solids from a flowing liquid other than water are also known. Many different liquids are filtered in daily use, and many different filtering devices are used. Generally a filtering device can only be used for a specific application and to filter a specific type of fluid. Devices for filtering some fluids have been widely developed and are extremely diversified. Filtering devices typically consist of a foraminous material through which a liquid is passed. Particles of material are passed through. These filters must typically be changed frequently due to the collection of material filtered from the liquid. While many of these filters work satisfactorily, they may not be cost effective since they have to be changed frequently, and they may prove detrimental to the environment thereby having special disposal requirements. Furthermore, if the liquid contains a large amount of material, the foraminous material around the inlet may become blocked very quickly without giving the liquid a chance to spread through the filter. This prevents uniform flow of liquid through the filter, reducing its efficiency or actually blocking the flow of liquid completely.

An example of such devices are oil filters for filtering oil used in the operation of a vehicle. The oil picks up solids which must be removed to lengthen the useful life of the oil and to prevent damage to the engine. These filters generally consist of a foraminous material through which a liquid is passed. Particles of material are trapped by the foraminous material while the liquid is passed through. These filters must be changed frequently due to the collection of material filtered from the oil. The used filters still contain quantities of oil when changed, and must be disposed of properly to avoid contaminating the environment.

It would be highly advantageous, therefore, to remedy the foregoing and other deficiencies inherent in the prior art.

Accordingly, it is an object of the present invention to provide improvements in filtering devices.

Another object of the present invention is to provide an improved filtering device for filtering flowing liquids.

And another object of the present invention is to provide a filtering device which is simple to install, maintain and use.

A further object of the present invention is to provide a filtering device which will filer contaminating liquids from a flowing liquid.

Still another object of the present invention is to provide a filtering device which may be easily drained and disassembled for cleaning.

Yet another object of the present invention is to provide a filter device which separates out materials which are less dense and materials which are more dense than the liquid being filtered.

Yet still another object of the present invention is to provide a filter device which will not clog immediately but will maintain a uniform flow through of fluid.

And a further object of the present invention is to provide a filter device which will substantially eliminate the formation of blockages in fluid conduits, substantially reducing the amount of time and effort expended in maintenance.

Yet a further object of the present invention is to provide a filter device which may be used in a variety of applications.

A further object of the present invention is to provide a filter apparatus which can be used to replace a conventional drain trap.

And yet a further object of the present invention is to provide a filter apparatus which provides a longer lasting fluid seal than a conventional drain trap.

And still another object of the present invention is to provide a filter device which increases environmental protection by eliminating the need for using environmentally damaging substances.

SUMMARY OF THE INVENTION

Briefly, to achieve the desired objects of the present invention in accordance with a preferred embodiment thereof, provided is a filter apparatus for removing material from a liquid flowing therethrough. The filter apparatus includes a reservoir, a housing and a separation assembly. The reservoir has a bottom, upright sidewall extending from the bottom and a rim. The housing includes a body configured to receive the reservoir, an inlet conduit extending into the body, an outlet conduit, and retaining means for retaining the reservoir within the body. The separation assembly is carried within the reservoir, and includes strainer means for straining the material out of the liquid, detention means for detaining the flow of the liquid, and a separation chamber wherein material more dense than the liquid settles from the detained liquid, and material less dense than the liquid rises to the top of the chamber.

In accordance with a preferred embodiment, the strainer means includes a plurality of nested strainers, capped and secured by a lid, the lid having an opening for sealably receiving the inlet conduit.

According to an alternate embodiment, the separation chamber includes an outer container and an inner container. The outer container includes a bottom, upright sidewalls, and an open top closed by a lid having an opening for sealably receiving the inlet conduit. The outer container is receivable within the reservoir such that the upright sidewalls are spaced apart from the reservoir. The inner container includes a bottom and upright sidewalls, receivable within the outer container such that the upright sidewalls of the inner container are spaced apart from the outer container. The inner container is configured to receive the nested strainers.

In yet another embodiment, the detention means includes the inner container and the outer container each having a plurality of spaced apart sections of apertures separated by buffer sections. Each of the plurality of apertures is formed through the upright sidewalls. The inner container and the outer container are aligned such that the sections of apertures of the inner container are opposed by the buffer sections of the outer container.

According to a further embodiment, a liquid vent is included for draining the liquid from the apparatus. The liquid vent has a first aperture formed through the bottom of the inner container, a second aperture formed through the bottom of the outer container, a third aperture formed through the reservoir and a plug removably inserted into the first, second, and third apertures, closing the apertures and aligning the inner container, the outer container, and the reservoir.

In yet a further embodiment, the body of the housing includes a top, upright sidewalls depending therefrom and an open bottom. The reservoir is receivable through the open bottom with its rim sealingly engaging the top of the body. The retaining means includes a lid having an opening formed therethrough for accommodating the plug extending from the reservoir, and attachment means for removably coupling said lid to said body of said housing.

According to yet another embodiment of the present invention, a support assembly is coupled to the housing for supporting the weight of the filter apparatus. The support assembly includes a rod having a first end and a second end, a conduit attachment member securable to a plumbing conduit for adjustably receiving the first end of the rod, and a projection formed on the housing for receiving the second end of the rod.

BRIEF DESCRIPTION OF THE DRAWINGS

The foregoing and further and more specific objects and advantages of the instant invention will become readily apparent to those skilled in the art from the following detailed description of a preferred embodiment thereof, taken in conjunction with the drawings, in which.

DETAILED DESCRIPTION OF THE PREFERRED EMBODIMENT

Figures 1, 2:
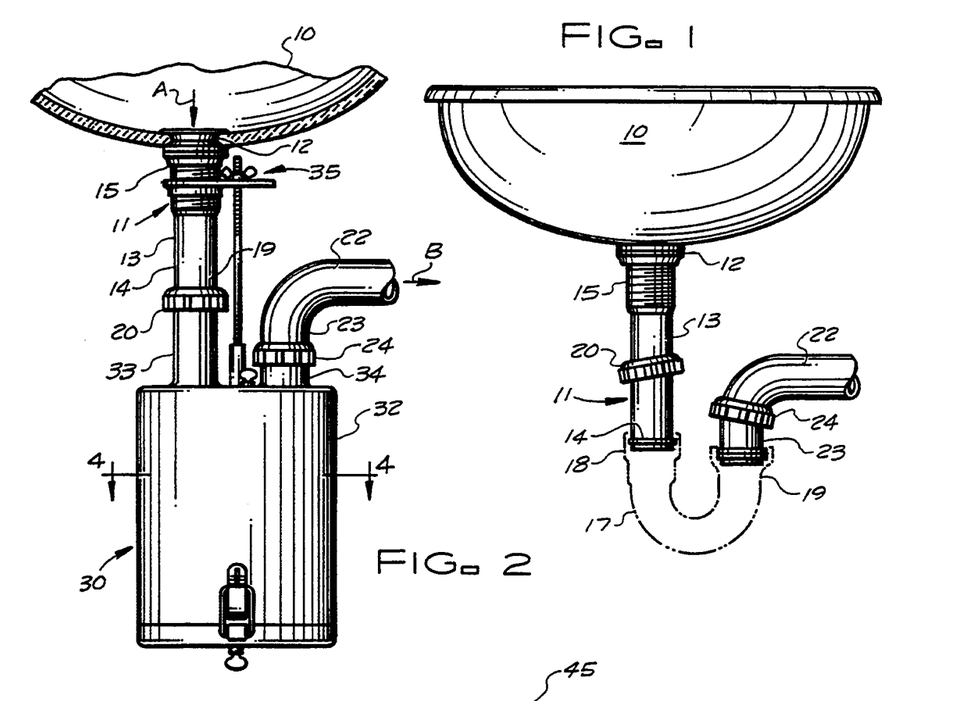
FIG. 1 is a side view of a conventional sink with a conventional drain trap.
FIG. 2 is a side view of a filter device, constructed in accordance with the teachings of the instant invention, as it would appear installed on a sink, replacing a conventional drain trap.

Turning now to the drawings in which like reference characters indicate corresponding elements throughout the several views, attention is first directed to FIG. 1 which illustrates a conventional sink 10 and conduit assembly 11. Sink 10 includes a drain 12 to which conduit assembly 11 is coupled. Conduit assembly 11 includes a drain conduit 13 extending from drain 12, and having an outflow end 14 and a threaded end 15. Threaded end 15 is coupled to drain 12 in a conventional manner well known to those skilled in the art. A conventional trap 17 having an inflow end 18 and an outflow end 19 is in fluid communication with sink 10, with inflow end 18 coupled to outflow end 14 of drain conduit 13 using a conventional coupler 20. A conduit 22 having an inflow end 23 is coupled to trap 17 with inflow end 23 of conduit 22 coupled to outflow end 19 of trap 17 using a conventional coupler 24. Trap 17 is illustrated in broken lines, specifically to illustrate the configuration of conduit assembly 11 without trap 17 being present.

Set forth for purposes of orientation and reference in connection with the ensuing detailed description of the preferred embodiment of the instant invention, the foregoing brief description of a conventional sink 10 and conduit assembly 11 is intended to be generally representative of typical, commercially available fluid flow systems. Details not specifically illustrated and described will be readily understood and appreciated by those skilled in the art.

Referring now to FIG. 2, a filter device generally designated by the reference character 30 is illustrated coupled between drain conduit 13 and conduit 22, replacing trap 17. Filter 30 includes a housing 32 having an inlet 33 and an outlet 34. Inlet 33 receives, and is coupled to, outflow end 19 of drain conduit 13 by coupler 20. Outlet 34 receives, and is coupled to, inflow end 23 of conduit 22 by coupler 24. Water drains from sink 10 in a direction indicated by arrowed line A, passes through filter device 30, and flows through conduit 22 in a direction indicated by arrowed line B. A support assembly 35 is coupled between housing 32 and drain conduit 13 to support the weight of filter device 30 and will be discussed in greater detail below.

Figure 3:
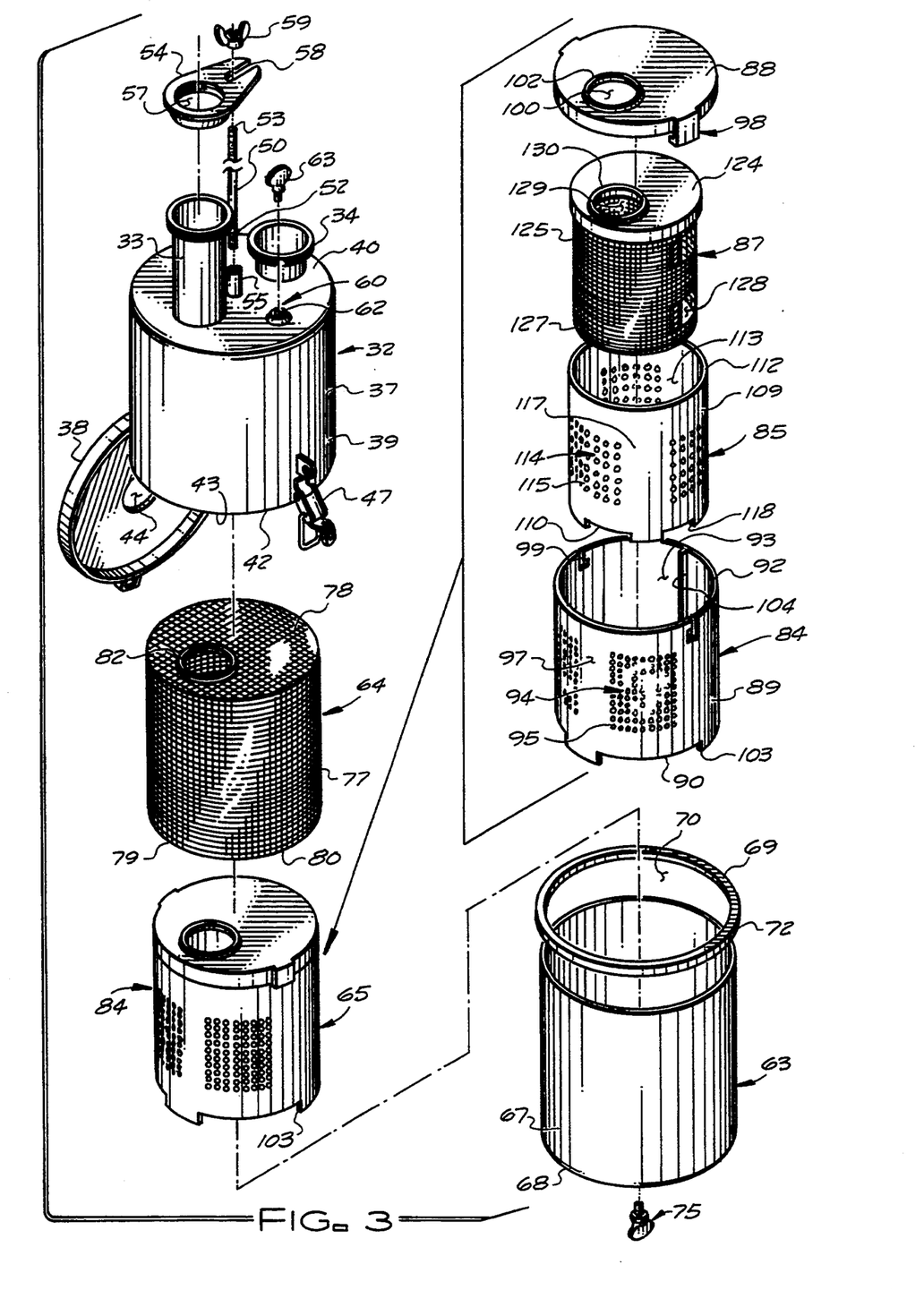
FIG. 3 is an exploded view of the filter device of FIG. 2.

Turning now to FIG. 3, housing 32 includes a body 37 and a retaining means, which while in this embodiment is a lid 38 will be understood to include other structures as will be made clear in the following description. Body 37 has a generally cylindrical side wall 39 extending from a top 40 at one end and forming a rim 42 at the opposing end. Rim 42 defines a downwardly directed opening 43 accessing the interior of body 37. Opening 43 is closable by lid 38. Lid 38 has a centrally located opening 44, the purpose of which will be discussed later in the description, and is coupled to body 37 by attachment means. Attachment means, in this embodiment, consists of a conventional hinge 45 (not visible) and latch 47. Hinge 45 pivotally couples one side of lid 38 to one side of side wall 39 proximate rim 42. Latch 47 detachably attaches the opposing side of lid 38 to the opposing side of side wall 39, closing opening 43. It will be understood that any conventional attachment means may be used which will detachably attach lid 38 to body 37 thereby allowing closure of opening 43 and alternatively, opening of opening 43 providing access to the interior of body 37. As described above, housing 32 also includes inlet 33 and outlet 34. Inlet 33 may be coupled to a flowing liquid source such as drain conduit 13 and extends through top 40 into the interior of housing 32. Outlet 34 extends from top 40 of body 37 in fluid communication with the interior of housing 32.

Support assembly 35 includes a rod 50 having opposing ends 52 and 53, and a conduit attachment member 54. End 52 of rod 50 is threaded and attached to top 40. End 53 is threaded and adjustably attached to attachment member 54. In this preferred embodiment rod 50 is attached to body 37 by a projection 55 extending centrally from top 40. Projection 55 is tapped to receive threaded end 52 of rod 50. Attachment member 54 is generally planar, having an opening 57 formed through one end, and a slot 58 formed through an opposing end. Opening 57 is threaded to receive threaded end 15 of drain conduit 13, firmly fixing attachment member 54 to drain conduit 13. Rod 50 is attached to attachment member 54 by inserting threaded end 53 through slot 58 and securing it with a wing nut 59. The length of rod 50 extending between attachment member 54 and projection 55 is variable by tightening or loosening wing nut 59.

A vent 60 is provided to allow bleeding of air from filter 30. Bleeding air from filter 30 may be desirable during installation of filter 30 or if there is a pressure build up inhibiting the flow of liquid. Vent 60 consists of an aperture 62 extending through top 40 and a plug 63 removably sealing aperture 62. In this embodiment, plug 63 is threaded and aperture 62 is tapped. Under normal conditions plug 63 is threaded into aperture 62. When venting of air is desired, plug 63 is removed from aperture 62 by unthreading.

Still referring to FIG. 3, filter 30 also includes a reservoir 63, a basket 64 and a separation assembly 65, each concentrically nested within the other, and carried by housing 32. Reservoir 63 has a generally cylindrical sidewall 67 extending from a bottom 68 at one end and forming a rim 69 at the opposing end. Rim 69 defines an opening 70 and has a gasket 72 associated therewith. A liquid vent 73 (not visible) is formed in bottom 68 to enable filter 30 to be emptied of liquid. Liquid vent 73 includes an aperture 74 (not visible) extending through bottom 68, closable by a plug 75. Plug 75 also acts as an aligning mechanism, extending through aperture 74 into filter device 30 and engaging separation assembly 65. Liquid vent 73 will be described in greater detail in connection with the description of separation assembly 65. In this embodiment, plug 75 is threadably inserted into aperture 74 preventing passage of liquid. Reservoir 63 is received through opening 43 of body 37 with opening 70 in an upwardly directed orientation. Lid 38 holds reservoir 63 within body 37 and firmly presses rim 69 against top 40 with gasket 72 forming a seal therebetween. Opening 44 of lid 38 permits plug 75 of liquid vent 73 to extend downward past housing 32. This allows liquid to be drained from filter device 30 without requiring lid 38 to be opened. While lid 38 is employed as retaining means for holding reservoir 63 within body 37 in this embodiment, it will be understood that any means which will retain reservoir 63, such as straps or clamps, may be used. However, the use of lid 38 has been determined to be the most convenient and efficient retaining means.

Basket 64 is constructed of a mesh or foraminous material and has a generally cylindrical sidewall 77 extending from a top 78 at one end and forming a rim 79 at the opposing end. Rim 79 defines an opening 80 accessing the interior of basket 64. An inlet opening 82 is formed through top 78 and configured to receive inlet 33 therethrough. A seal 83 is associated with inlet opening 82, to form a sealing engagement between inlet 33 and basket 64. Basket 64 is received within reservoir 63 with opening 80 oriented in a downward direction and rim 79 resting against and supported by bottom 68. Basket 64 is an optional portion of filter device 30, adding an additional degree of filtration, however, the main filtering effort is provided by separation assembly 65.

Separation assembly 65 is configured to be received within an carried by reservoir 63. Separation assembly 65 includes an outer container 84, an inner container 85 and a strainer assembly 87, each nested within the other, and covered by a lid 88. Outer container 84 has a generally cylindrical sidewall 89 extending from a bottom 90 at one end and forming a rim 92 at the opposing end. Rim 92 defines an opening 93 through which inner container 85 and strainer assembly 87 are inserted. Side wall 89 includes sections 94 having a plurality of apertures 95 extending therethrough. Sections 94 of apertures 95 are positioned in a band around the central portion of side wall 89, spaced apart from rim 92 and bottom 90. Each section 94 is separated from an adjacent section 94 by buffers 97. Buffers 97 are solid sections of side wall 89 whose purpose will be discussed in the subsequent description.

Lid 88 is coupled to rim 92 of outer container 84 by securement means. Securement means, in this embodiment, consists of a pair of tabs 98 extending from opposing sides of lid 88, and a pair of slots 99 formed in opposing sides of side wall 89 proximate rim 92 as can be seen with additional reference to FIG. 6. Tabs 98 and slots 99 cooperate in a bayonet type coupling, well known to those skilled in the art. It will be understood that other means may be employed for removably securing lid 88 to outer container 84. An inlet opening 100 is formed through lid 88 and configured to receive inlet 33 therethrough. A seal 102 is associated with inlet opening 100 to form a sealing engagement between inlet 33 and separation assembly 65.

Outer container 84 is concentrically nested within reservoir 63, with basket 64 received thereabout. Basket 64 is positioned with top 78 overlying lid 88 and inlet opening 82 aligned with inlet opening 100. Spacers 103 extend from bottom 90 of outer container 84 and are positioned so as to support bottom 90 of outer container 84 in a spaced apart relationship with bottom 68 of reservoir 63. A threaded aperture 91 (not visible) is formed centrally through bottom 90, configured to receive plug 75. Plug 75 extends through aperture 74 of reservoir 63 and into aperture 91, aligning outer container 84 properly within reservoir 63. With the removal of plug 75, aperture 91 provides an opening through which liquid can drain out of outer container 84. The liquid drained from outer container 84 is in turn drain through aperture 74.

Inner container 85 has a generally cylindrical sidewall 109 extending from a bottom 110 at one end and forming a rim 112 at the opposing end. Rim 112 defines an opening 113 through which strainer assembly 87 is inserted. Side wall 109 includes sections 114 having a plurality of apertures 115 extending therethrough. Sections 114 of apertures 115 are positioned in a band around the central portion of side wall 109, spaced apart from rim 112 end bottom 110. Each section 114 is separated from an adjacent section 114 by buffers 117. Buffers 117 are solid sections of side wall 109 whose purpose will be discussed in the subsequent description.

Inner container 85 is concentrically nested within outer container 84, with rim 112 extending upward slightly above the level of rim 92 of outer container 84, bringing rim 112 into a position proximate lid 88. Spacers 118 extend from bottom 110 of inner container 85 and are positioned so as to support bottom 110 of inner container 85 in a spaced apart relationship with bottom 90 of outer container 84. Inner container 85 is positioned within outer container 84 such that sections 94 and sections 114 are in a staggered configuration. That is, sections 144 of inner container are opposed by buffers 97 of outer container 84. This prevents direct flow through of liquid. In this manner, the liquid is detained within separation assembly 65 and required to take a convoluted path. To aid in achieving proper alignment of inner container 85 and outer container 84, a ridge 104 or other aligning means may be formed on the inner surface of outer container 84 which interacts with a portion of inner container 85. This alignment feature may also be continued throughout the filter, allowing alignment of each of the various elements to insure proper functioning of filter 30. Aligning means may be any conventional means such as ridges, tabs, indentations or simply marks which would be aligned with corresponding marks. To aid in concentrically aligning inner container 85 within outer container 84, a threaded aperture 111 (not visible) is formed centrally through bottom 110. Plug 75 extends through apertures 74 and 91 of reservoir 63 and outer container 84 respectively, and into aperture 111, aligning inner container 85 properly within outer container 84. With the removal of plug 75, aperture 111 provides an opening through which liquid can drain out of inner container 85. The liquid drained from inner container 85 is in turn drain through aperture 91 and aperture 74.

Still referring to FIG. 3, strainer assembly 87 is nested within inner container 85. With additional reference to FIG. 7, strainer assembly 87 includes an inner strainer 120, a middle strainer 122 and an outer strainer 123 arranged one within the other in at least a partial spaced apart relationship, and capped by a lid 124. Each strainer has a top end 125 and a bottom end 127, and may be constructed of a mesh material or other foraminous materials. While each of the strainers may have apertures of the same size, in the preferred embodiment aperture size is reduced from inner strainer 120 to outer strainer 123. Also included in the preferred embodiment are openings 128 formed in the strainers. These openings are positioned in a staggered fashion so as to prevent direct outflow of liquid through openings 128, from inner strainer 120 to outer strainer 123. The purpose of openings 128 is to permit flow of liquid through strainer assembly 87 even when the apertures of any one or more of the strainers are clogged from liquid born materials. Top ends 125 are received within lid 124, and bottom ends 127 are support by bottom 110 of inner container 85.

Figure 7:
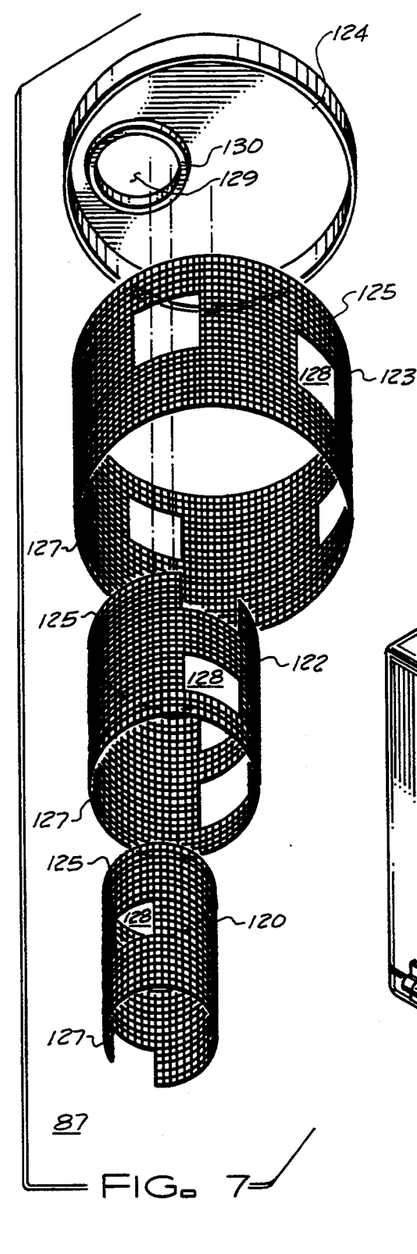
FIG. 7 is an exploded view of a strainer assembly.

An inlet opening 129 is formed through lid 124 and configured to receive inlet 33 therethrough. A seal 130 is associated with inlet opening 129 to form a sealing engagement between inlet 33 and lid 124. Strainer assembly 87 is positioned with lid 88 closely overlying lid 124 and inlet opening 100 aligned with inlet opening 129.

Figures 5, 6:
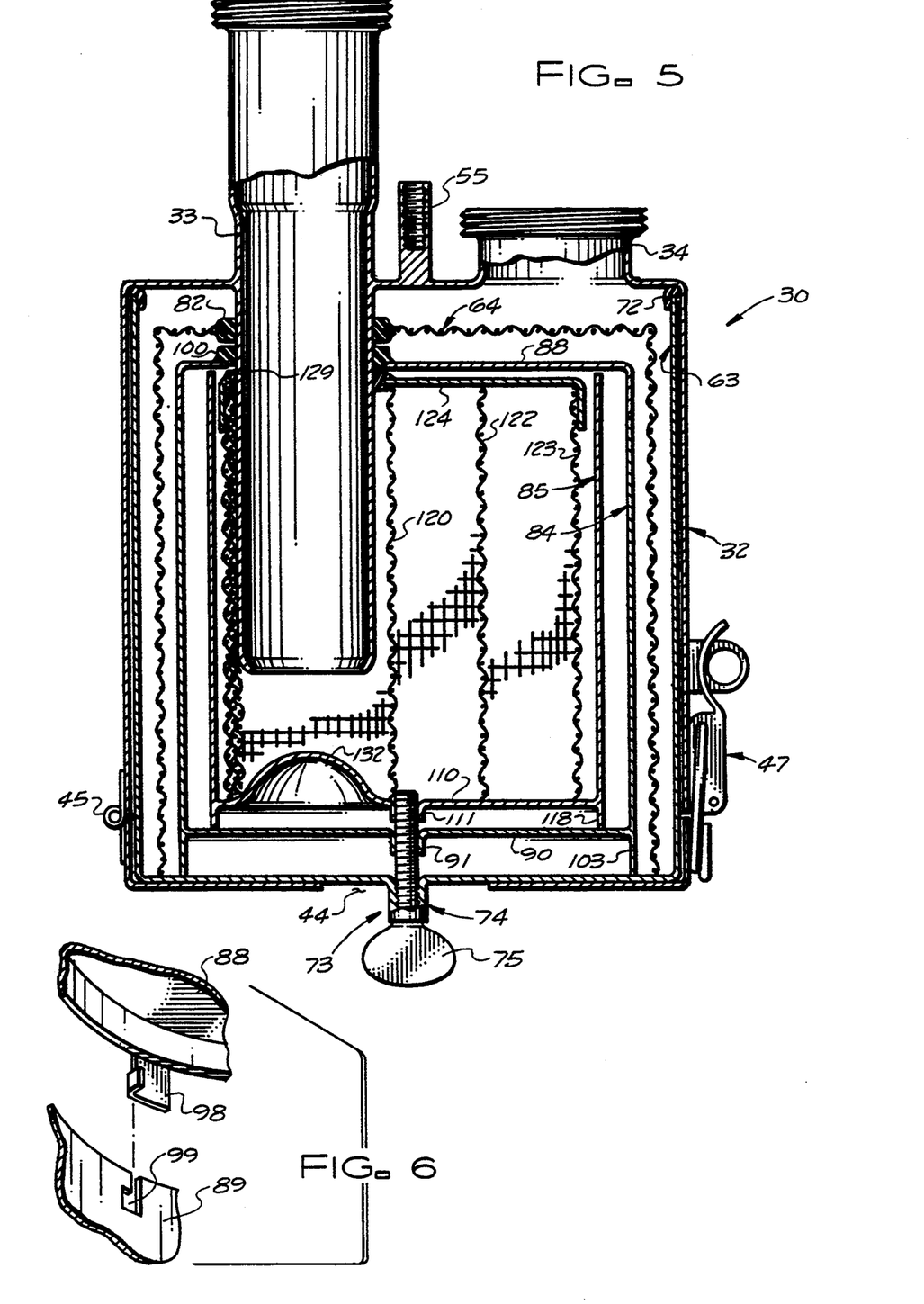
FIG. 5 is a cross sectional side view of the filter device of FIG. 2.
FIG. 6 is an enlarged perspective view of a lid fastening member.

Referring now to FIG. 5, filter 30 is illustrated with the components assembled. Strainer assembly 87 is nested within inner container 85, which is nested within outer container 84, completing separation assembly 65. Separation assembly 65 is covered by basket 64 and nested within reservoir 63. Plug 75 extends through apertures 74, 91, and 111 respectively, preventing draining of liquid from filter device 30 and aligning outer container 84 and inner container 83 concentrically within reservoir 63. Reservoir 63 is received in housing 32 with inlet 33 extending downwardly through inlet openings 82, 100 and 129, to a position spaced apart from bottom 110 of inner container 85. As liquid enters filter 30 through inlet 33, the liquid is diverted from a vertical flow to a horizontal flow by a disperser 132. Disperser 132 is a raised dome formed in bottom 110 directly below inlet 33 which deflects inflowing liquid horizontally outward and prevents the generation of noise and vibration from the incoming liquid.

Figure 4:
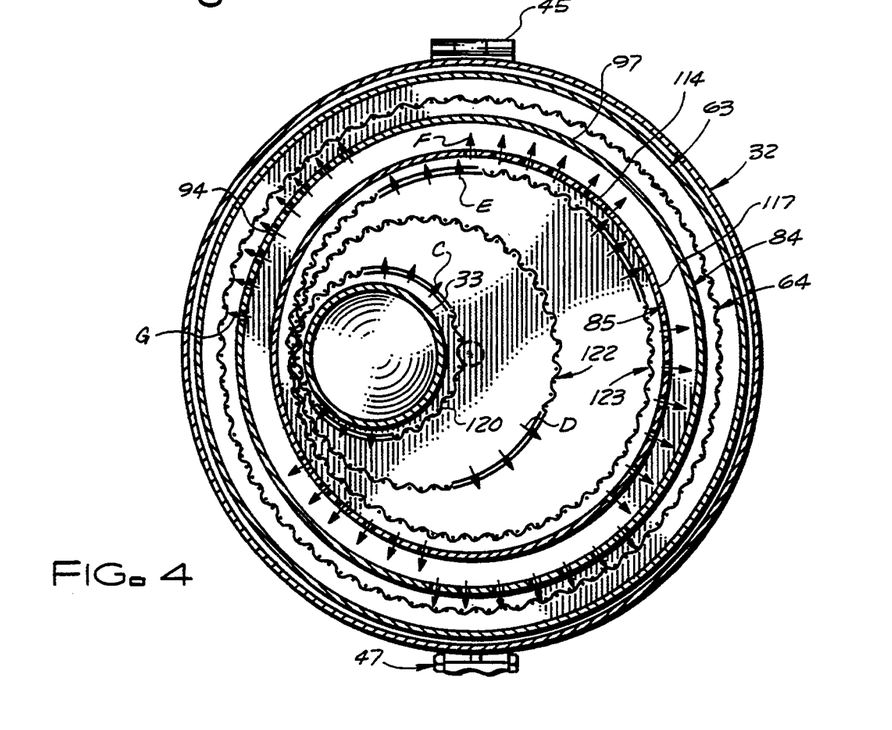
FIG. 4 is a cross sectional top view taken along line 4—4 of FIG. 2.

With additional reference to FIG. 4, liquid flowing into filter device 30 through inlet 33 is dispersed outward by disperser 132. The liquid then flows out of inner strainer 120 as indicated by arrowed lines C. Large particles are removed from the liquid by inner strainer 120. Progressively smaller particles are removed from the liquid as it progresses through middle strainer 122 as indicated by arrowed lines D, and outer strainer 123 as indicated by arrowed lines E. Each progressive strainer slows the liquid and removes more particles. As the liquid slows, materials which are more dense than the liquid settle to bottom 110 of inner container 85 and materials which are less dense rise into lid 124. Liquid flowing from strainer assembly 87 is further slowed by buffers 117 which intercept a portion of the liquid, and redirect it to one of sections 114 of apertures 115. As the liquid is slowed and redirected, more materials float upward to be contained by lid 88, and settle to be collected by bottom 110. The liquid flows through apertures 115 as indicated by arrowed lines F and additional particles are strained from the liquid. Liquid flowing out of apertures 115 of inner container 85 strikes buffers 97 of outer container 84. Buffers 97 again slow the flow of the liquid and redirect it to sections 94 of apertures 95. During this redirection of the liquids, additional material settles to bottom 90 of outer container 84 and rises to lid 88. The liquid flows through apertures 95 as indicated by arrowed lines G and additional particles are strained from the liquid. The filtered fluid then collects in reservoir 63, filling it and forcing filtered liquid out outlet 34. In this manner, not only is the liquid filtered through a decreasing gradient of aperture sizes, but additional materials, such as fats and oils or dense materials such as metals, are removed using gravity.

It should be noted that apertures 95 and 115 of sections 94 and 114 each have a combined area preferably equal to or greater than the area of the inlet conduit. This allows a flow rate through the filter equal to the flow rate into the filter, preventing back-up of liquid.

When in use, filter device 30 must be cleaned periodically to remove the materials left behind. This is accomplished by removing plug 75, and allowing liquid in filter device 30 to drain through apertures 74, 91, and 111. After the fluid has drained from filter device 30, it is disassembled by opening lid 38 and removing reservoir 63 containing basket 64 and separation assembly 65. The material filtered from the liquid is removed, and the elements reassembled. In this manner, filter device 30, once installed may be cleaned and reused indefinitely.

Figure 8:
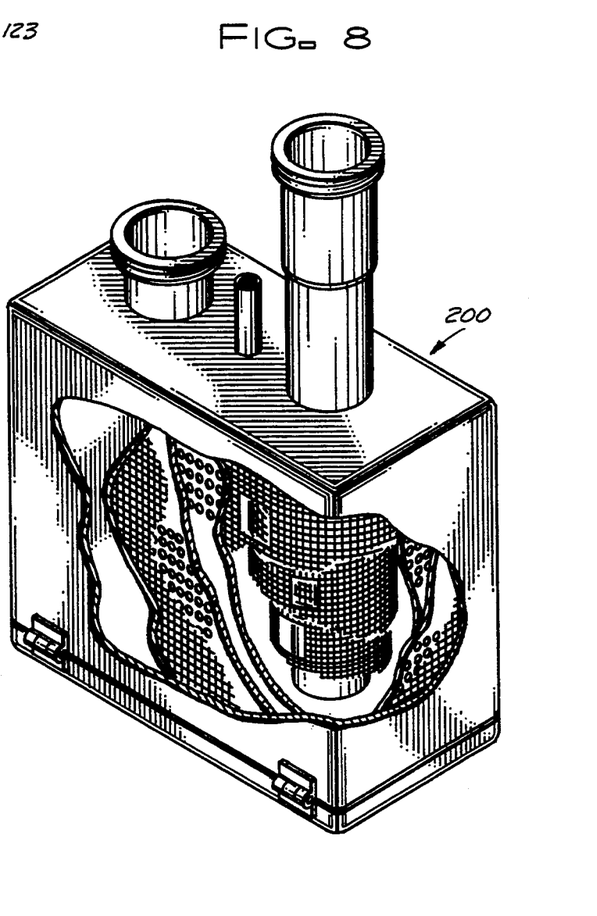
FIG. 8 is a partial sectional perspective view of another embodiment, constructed in accordance with the teachings of the instant invention.

Those skilled in the art will appreciated that while a generally cylindrical shaped filter device 30 has been described, other shapes have been contemplated for the filter device of the present invention. FIG. 8 illustrates an alternate embodiment of a filter device generally designated 200, including each of the elements described in filter device 30, with the exception of those elements being rectangular in shape as opposed to being cylindrical. Furthermore, while filter device 30 was specifically described as a filter replacing a conventional trap in a sink for filtering drain water, it has been contemplated that filter devices of the type described could be used in a wide variety of applications. Examples of various applications include use as oil filters for filtering oil in vehicles, filters in evaporative cooling devices, and many other uses where it is desirous for a flowing liquid to be filtered. For example, washing machines have an outflow tube which drains water from the washing machine. This water generally includes a great deal of material which easily clogs drain conduits and interrupts outflow of drain water. Use of filter device 30 in this application would prevents clogging with minimum effort.

It will also be understood that the size of the filtering device is not limited. An enlarged filter device of the present invention can be used for filtering large volumes of inflowing fluid. For example, the filter device can be used in conjunction with a water treatment plant, to collect waste solids and separate various liquids before the water is received for chemical treatment.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. A filter apparatus for removing material from a liquid, said apparatus comprising:
   a reservoir for collecting filtered liquid;
   a housing having a body configured to receive said reservoir, an inlet conduit extending into said body, an outlet and retaining means for securing said reservoir within said body; and
   a separator assembly for separating said materials from said liquid, nested within said reservoir, said separator assembly including,
      an outer container having a bottom, upright sidewalls, and an open top closed by a lid having an opening for sealably receiving said inlet conduit, said outer container receivable within said reservoir such that said upright sidewalls are spaced apart from said reservoir,
      an inner container having a bottom and upright sidewalls, receivable within said outer container such that said upright sidewalls of said inner container are spaced apart from said outer container, and
      a strainer assembly receivable within said inner container, said inlet conduit receivable therein.

2. An apparatus as claimed in claim 1 wherein said strainer assembly includes a plurality of nested strainers, capped and secured by a lid, said lid having an opening for sealably receiving said inlet conduit.

3. An apparatus as claimed in claim 2 wherein said inner container and said outer container each include a plurality of spaced apart sections of apertures separated by buffer sections, each of said plurality of apertures formed through said upright sidewalls, said inner container and said outer container aligned such that said sections of apertures of said inner container are opposed by said buffer sections of said outer container.

4. An apparatus as claimed in claim 3 further includes a liquid vent having a first aperture formed through said bottom of said inner container, a second aperture formed through said bottom of said outer container, a third aperture formed through said reservoir and a plug removably inserted into said first, second, and third apertures closing said apertures and aligning said inner container, said outer container, and said reservoir.

5. An apparatus as claimed in claim 4 wherein said separator assembly further includes a disperser which deflects inflowing liquid horizontally outward and prevents the generation of noise and vibration.

6. An apparatus as claimed in claim 5 wherein said disperser includes a raised dome formed in said bottom of said inner container, directly below said inlet conduit.

7. An apparatus as claimed in claim 5 wherein said retaining means includes a lid having an opening formed therethrough for accommodating said plug extending from said reservoir, and attachment means for removably coupling said lid to said body of said housing.

8. An apparatus as claimed in claim 7 wherein said attachment means includes a hinge pivotally coupling one side of said lid to said body, and a latch for releasably retaining an opposing side of said lid to said body.

9. An apparatus as claimed in claim 7 further including a support assembly coupled to said housing for supporting the weight of said filter apparatus.

10. An apparatus as claimed in claim 9 wherein said support assembly includes:
- a rod having a first end and a second end;
- a conduit attachment member securable to a plumbing conduit for adjustably receiving said first end of said rod; and
- a projection formed on said housing for receiving said second end of said rod.

11. A filter apparatus for removing material from a liquid flowing therethrough, said apparatus comprising:
- a reservoir having a bottom and upright sidewalls extending from said bottom, terminating in a rim;
- a housing having a body configured to receive said reservoir, an inlet conduit extending into said body, an outlet conduit, and retaining means for retaining said reservoir within said body; and
- a separator assembly carried within said reservoir, said separator assembly including,
  - strainer means for straining said material out of said liquid and having a plurality of nested strainers, capped and secured by a lid, said lid having an opening for sealably receiving said inlet conduit, detention means for detaining said flow liquid, and
  - a separation chamber wherein material more dense than said liquid settles from said detained liquid, and material less dense than said liquid rises to the top of the chamber and having an outer container having a bottom, upright sidewalls, and an open top closed by a lid having an opening for sealably receiving said inlet conduit, said outer container receivable within said reservoir such that said upright sidewalls are spaced apart from said reservoir, and
  - an inner container having a bottom and upright sidewalls, receivable within said outer container such that said upright sidewalls of said inner container are spaced apart from said outer container, said inner container configured to receive said nested strainers.

12. An apparatus as claimed in claim 11 wherein said detention means includes said inner container and said outer container each having a plurality of spaced apart sections of apertures separated by buffer sections, each of said plurality of apertures formed through said upright sidewalls, said inner container and said outer container aligned such that said sections of apertures of said inner container are opposed by said buffer sections of said outer container.

13. An apparatus as claimed in claim 12 further including a liquid vent for draining said liquid from said apparatus, said liquid vent including:
- a first aperture formed through said bottom of said inner container;
- a second aperture formed through said bottom of said outer container;
- a third aperture formed through said reservoir; and
- a plug removably inserted into said first, second, and third apertures closing said apertures and aligning said inner container, said outer container, and said reservoir.

14. An apparatus as claimed in claim 13, wherein said body includes a top, upright sidewalls depending therefrom and an open bottom, said reservoir being receivable through said open bottom with said rim sealingly engaging said top of said body.

15. An apparatus as claimed in claim 14 wherein said retaining means includes a lid having an opening formed therethrough for accommodating said plug extending from said reservoir, and attachment means for removably coupling said lid to said body of said housing.

16. An apparatus as claimed in claim 15 wherein said attachment means includes a hinge pivotally coupling one side of said lid to said body, and a latch for releasably retaining an opposing side of said lid to said body.

17. An apparatus as claimed in claim 16 further including a basket received within said reservoir, said basket having a top with an opening for sealably receiving said inlet conduit and upright sidewalls depending therefrom.

18. An apparatus as claimed in claim 16 further including a support assembly coupled to said housing for supporting the weight of said filter apparatus.

19. An apparatus as claimed in claim 18 wherein said support assembly includes:
- a rod having a first end and a second end;
- a conduit attachment member securable to a plumbing conduit for adjustably receiving said first end of said rod; and
- a projection formed on said housing for receiving said second end of said rod.

* * * * *